E. T. FORD.
Harvester.
No. 37,371. Patented Jan'y 6, 1863.
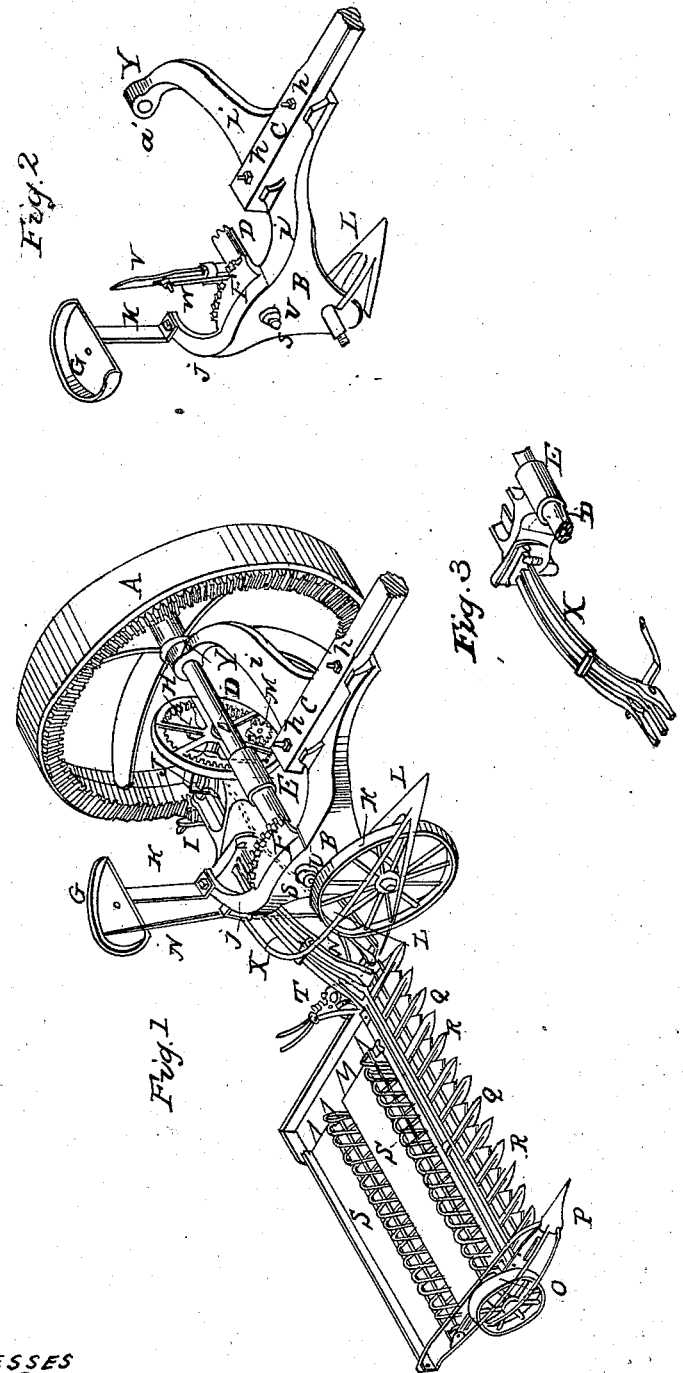
WITNESSES
INVENTOR

UNITED STATES PATENT OFFICE.

E. T. FORD, OF BUFFALO, ASSIGNOR TO WALTER A. WOOD, OF HOOSICK FALLS, NEW YORK.

IMPROVEMENT IN HARVESTERS.

Specification forming part of Letters Patent No. 37,371, dated January 6, 1863.

*To all whom it may concern:*

Be it known that I, ELIAS T. FORD, formerly of the city of Buffalo, State of New York, but now of Stillwater, county of Saratoga, and State aforesaid, have invented new and useful Improvements in Reaping and Mowing Machines; and I do hereby declare that the following is a full, clear, and exact description of the invention and improvements sold, assigned, and transferred by me, by deed of assignment, to WALTER A. WOOD, of Hoosick Falls, county of Rensselaer, and State aforesaid, on the 14th day of May, 1862, and which said deed was duly recorded in the United States Patent Office on the 26th day of May, 1862, in Liber P$^6$, page 26, of Transfers of Patents.

Figure 1 is a perspective view of a machine having thereto attached the invention and improvements herein described and set forth. Fig. 2 represents in perspective the yoke or seat and tongue-plate detached from the other parts of the machine. Fig. 3 represents in perspective the coupling-bar for connecting the cutting apparatus to the machine.

The nature of my invention consists in an independent yoke or seat and tongue-plate cast in one piece and hinged to or upon the main axle, so as to act independent of said main axle, and capable of supporting the tongue and driver's seat both.

To enable others skilled in the art to make and use my invention, I will proceed to describe the same with reference to the drawings.

The several parts of a harvesting-machine being distinctly shown in the drawings, I do not propose to describe them in detail any further than to show the connection and operation of the yoke or seat and tongue-plate with them. By "independent yoke or seat and tongue-plate" I mean acting independent of the finger-bar or cutting apparatus, for, were the finger-bar connected to this yoke or plate, it would rock or roll as the plate moved on the main axle, and thus throw the points of the guards up too high, or down so as to run into the ground. The yoke or seat and tongue-plate has another independent action—viz., upon the main axle, it being hinged so as to turn thereon.

$i\ i$ represent the yoke or seat and tongue-plate. It is cast in one piece, and is furnished with suitable bearings, as at U and $a'$, to receive and to turn upon the main axle D. These bearings should be sufficiently long or sufficiently remote from each other to give said yoke or plate a firm support upon the axle. The tongue C is bolted to this yoke or plate in front of axle D, and the seat G is supported also upon it, so that one may aid in balancing the other. It is obvious that by this arrangement but little weight will be thrown upon the horses' necks, and that the horses, in passing over eminences or depressions in or on the surface of the ground, will not communicate such rising or falling motions to the cutting apparatus, but simply cause the yoke or plate to rock or roll slightly on the main axle. The casting of this seat or tongue-plate in one piece simplifies and cheapens the construction of the machine.

Having thus fully described the nature and object of my invention, what I claim is—

An independent yoke or seat and tongue-plate, cast in one piece and hinged to the main axle, in the manner and for the purpose substantially as described.

ELIAS T. FORD.

Witnesses:
MARCUS P. NORTON,
C. C. NEILSON.